(No Model.)
J. KIMBALL.
MEASUREMENT INDICATOR OF BOOT AND SHOE LASTS.
No. 331,143. Patented Nov. 24, 1885.
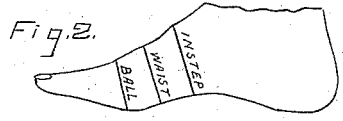

UNITED STATES PATENT OFFICE.

JOHN KIMBALL, OF BOSTON, MASSACHUSETTS.

MEASUREMENT-INDICATOR OF BOOT AND SHOE LASTS.

SPECIFICATION forming part of Letters Patent No. 331,143, dated November 24, 1885.

Application filed April 30, 1885. Serial No. 164,051. (No model.)

*To all whom it may concern:*

Be it known that I, JOHN KIMBALL, of Boston, in the county of Suffolk and State of Massachusetts, have invented certain new and useful Improvements in Measurement-Indicators of Boot and Shoe Lasts for Manufacturers, Dealers, and Consumers, of which the following is a full, clear, and exact description.

As the manufacture or trade in boots and shoes is now carried on there is nothing in any respect determined or established from which to determine the dimensions of boots and shoes, or, in other words, their lasts, except as to their length, and even as to this measurement of lasts—the length—two standards or systems are in vogue—to wit, one known as the "English," and the other known as the "New York" system. The shortest last, English system, is four inches, and is indicated by a cipher, (0.) The next longer is four and four-twelfths inches, and is indicated by a figure 1, and so on by a gradual but regular increase in length of four-twelfths of an inch for each numbering of the sizes of lasts—by steps of one-half sizes, from and including No. 1 to the highest number of sizes of lasts, whatever that may be—as, for instance, for women's, 1½ to 7½; for men's, 5 to 13; for boys', 1 to 5½; for youths', 9 to 13½; for misses', 10 to 13½ and 1 to 2, and for children's 0 and 1 to 9½. The shortest last, New York system, is four and two-twelfths inches, and is indicated by a figure 1, and it is two-twelfths inch shorter than the same numbered last English system, and is indicated by a figure 1, which is the figure indicating the last next to the shortest of the English. The next longer is four and four-twelfths inches, and is indicated by figures 1½, and so on by a gradual but regular increase in length of two-twelfths of an inch for each numbering of the sizes of lasts by steps of one-half sizes from No. 1 to the highest number of the sizes of the last, whatever that may be, and which are the same as given above for the last of the English system. These two systems—English and New York—of measurement of the lengths of lasts, because of the variations between them above stated, plainly in the trade must and do cause trouble, uncertainty, and annoyance to manufacturers, dealers, and purchasers, or users, and when it is considered that in addition thereto there is an absolute lack of any standard or system which determines correctly and uniformly the measurements of the ball, waist, and instep of the lasts the confusion and uncertainty of measurements in the trade are so manifest that it seems wholly unnecessary to here enter into any detail or particular statement thereof.

The object of this invention therefore is to provide a means for a uniform correct standard or system of measurements to be used in the manufacture of boots and shoes, and one which will be most convenient and ready for use by manufacturers, dealers, purchasers, and consumers of boots and shoes, and which will enable any given standard size or sizes of boots and shoes with standard measurements thereof at the ball, waist, and instep to be regularly produced on order from dealers or consumers by manufacturers and from the employment only in such orders of two sets of arbitrary symbols or characters, one set to indicate and the other set to classify the lasts, coupled or combined with the number of the size of the lasts as to their length, and from all of which, by reference simply, the exact measurements for ball, waist, and instep for the size or length desired of last so indicated and classified can be ascertained.

For the best attainment of the object which is sought by this invention, the lasts should be made according to a system which will, in every instance, locate definitely and precisely the same spot in lasts of given length at which to measure them as to the ball, waist, and instep measurements the lasts are to have, and for this purpose, or for a system of measurement of lasts, the gage shown and described in Letters Patent of the United States dated March 4, 1879, No. 212,852, is most applicable.

To secure the object above stated, the improved measurement-indicator of boots and shoes for manufacturers, dealers, and consumers in substance is composed of a series of sheets of paper or card-board, or of other suitable sheet material, by preference bound in a book form. Each sheet of these series of sheets is ruled off or otherwise divided in one direction into a series of distinct and separate defined spaces, so that the two opposite pages of the book when opened will present, for instance, ten of said separate spaces, or, in other words a number of them corresponding to the number of the different classifying symbols, (each having a definite and invariable meaning,) which are employed with each indicating symbol, and each of said series of spaces is ruled off or otherwise divided at right angles to its length into a series of separate parallel columns, equal in number to the several sizes or numbers of lasts embraced in each of said indicating symbols thereof, and these columns are headed in regular order from left to right, in accordance therewith—as, for instance, "1½;" "2;" "2½;" "3;" "3½;" "4;" "4½;" "5;" "5½;" "6;" "6½;" "7;" "7½." These said series of spaces are each also provided with one additional column at the left of said series of columns, and in this additional column, in each instance, are indicated in any suitable manner—as, for instance, by printing—the indicating and classifying symbols, and in the same line with the figures noting the sizes of lasts, as before stated. Again, "ball," "waist," and "instep" are entered in the line-spaces below said line having the indicating and classifying symbols, and in the order, preferably, above stated, and, furthermore, each of the ten spaces before referred to is headed with a statement, in print or otherwise, of the relation in measurement of the instep to the ball and waist to the ball shown and covered by the list of measurements against ball, waist, and instep contained in the several vertical columns of said space.

For the full carrying out of this invention, a sheet of paper or card-board having the characteristics of this invention should be provided for each of the indicating-symbols of the several lasts for the different kinds of boot and shoe wear—as, for instance, women's, men's, boys', youths', misses', and children's—and, as before stated and for most convenient use, the several sheets of each kind of lasts or for two or more kinds of lasts are to be bound in book form, and as so bound arranged each kind in their proper series and one series following another, and preferably in the order in which the several kinds of lasts have been just above given.

In the drawings forming a part of this specification, Figure 1 is a face view of the present improved measurement-indicator of boot and shoe lasts for manufacturers, dealers, and consumers, showing it in connection with the measurements of a last for women and for one indicating-letter or other indicating-symbol, with the several classifying-letters or other classifying-symbols. Fig. 2 is a side view of a person's foot, and illustrates the lines or directions of location of the ball, waist, and instep measurements thereof as the same should be made for the best results to be secured with the measurement-indicator of this invention.

In the drawings, A represents the indicator of this invention. This indicator is divided into ten separate and distinct indicating and classifying spaces, B, and each space B extends horizontally half across the width of the indicator A. These indicating and classifying spaces B are of equal width, and are arranged in two vertical columns, C D, placed along side of each other, and each column C D is headed "women's," and each space B is similarly ruled off into four horizontal-line spaces, E, of equal width, and into thirteen vertical columns F, of equal width, and a vertical column, G, of additional width, which is located at the left of said series of vertical columns F. In the wider vertical column G of each of the indicating and classifying spaces B, and the first horizontal line space E thereof, are placed the indicating and classifying letters or other symbols of the last—as, for instance, in the first horizontal space, E, "O. K.;" in the second, "O. L.," and so on through the series of said horizontal spaces E—as follows: "O. M.," "O. N.," "O. P.," "O. R.," "O. S.," "O. T.," "O. U.," "O. W." "O" in each horizontal space of the several indicating and classifying spaces B is the indicating-letter, and the letter added thereto—as, for instance, the letter "K"—as above recited, is the classifying-letter.

The several indicating-letters preferably employed are as follows: "O.," "A.," "B.," "C.," "D.," "E.," "F.," "G.," "H.," "I.," and they are hereinafter so referred to, and in each instance the letter represents the fullness of the last—that is, the measurement which the last is to have at and around the ball only. Following these indicating and classifying letters in each indicating and classifying space B, and in the same horizontal line-space E therewith, and in regular order for the thirteen vertical columns from left to right, are placed the sizes of lasts, and as shown—

For women's, from 1½ to 7½, both inclusive, in regular steps of one-half sizes.

For men's, (not shown in the drawings,) from 5 to 13, both inclusive, in regular steps of one-half sizes.

For boys', (not shown in the drawings,) from 1 to 5½, both inclusive, in regular steps of one-half sizes.

For youths', (not shown in the drawings,) from 9 to 13½, both inclusive, in regular steps of one-half sizes.

For misses', (not shown in the drawings,) from 10 to 13½, both inclusive, and 1 to 2, both inclusive, in regular steps of one-half sizes.

For children's, (not shown in the drawings,) from 0 to 9½, both inclusive, in regular steps of one-half sizes.

Again, in said wider vertical column G, and in the three horizontal line-spaces E thereof, below the horizontal line-space E having the indicating and classifying letters and statement of sizes, as above recited, and in each indicating and classifying space B are entered "ball," "waist," and "instep," in the order named, followed in each instance by the entry in the several thirteen vertical columns at the right of said wider column and one after another thereof of the measurements for the lasts of said common indicating-letter "O,"

and of the separate classifying-letters "K.," "L.," "M.," "N.," "P.," "R.," "S.," "T.," "U.," and "W.," all as shown in the drawings.

In the indicator A shown, (and it is the same in principle, varying only in detail—that is, only in changes of measurements, as will hereinafter appear)—for any indicating-letter of the lasts (and whether the lasts are women's, men's, boys', youths', misses', or children's,) and for all the classifying-letters of such indicating-letter the measurement of the ball is always the same and begins with a stated measurement—as, for instance, as particularly shown in the drawings.

With women's lasts, for the indicating-letter "O.," a measurement of six inches and proceeding upward therefrom with a regular increase of three-sixteenths of an inch for each of the succeeding indicating-letters of the series of such letters, to wit, "A.," "B.," "C.," "D.," "E.," "F.," "G.," "H.," and "I.," ending with seven and eleven-sixteenths inches for the last indicating-letter "I."

With men's lasts, (not shown in the drawings,) for the indicating-letter "O.," a measurement of seven and two-eighths inches and proceeding upward therefrom with a regular increase of two eighths of an inch for each of the succeeding indicating-letters of the series of such letters, to wit, "A.," "B.," "C.," "D.," "E.," "F.," "G.," "H.," and "I.," and ending with nine and four-eighths inches for the last indicating-letter, "I."

With boys' lasts, (not shown in the drawings,) for the indicating-letter "O.," a measurement of five and six-eighths inches and proceeding upward therefrom with a regular increase of two-eighths of an inch for each of the succeeding letters of the series of such letters, to wit, "A.," "B.," "C.," "D.," "E.," "F.," "G.," "H.," and "I.," ending with eight inches for the last indicating-letter, "I."

With youths' lasts, (not shown in the drawings,) for the indicating-letter "O.," a measurement of five and two-sixteenths inches proceeding upward therefrom with a regular increase of three-sixteenths of an inch for each of the succeeding indicating-letters of the series of such letters, to wit, "A.," "B.," "C.," "D.," "E.," "F.," "G.," "H.," and "I.," ending with six and thirteen-sixteenths inches for the last indicating-letter, "I."

With misses' lasts, (not shown in the drawings,) for the indicating-letter "O.," a measurement of five and two-sixteenths inches, and proceeding upward therefrom with a regular increase of three-sixteenths of an inch for each of the succeding indicating-letters of the series of such letters, to wit, "A.," "B.," "C.," "D.," "E.," "F.," "G.," "H.," and "I.," ending with six and thirteen-sixteenths inches for the last indicating-letter, "I."

With children's lasts, (not shown in the drawings,) for the indicating-letter "O.," a measurement of three and one-sixteenth inches and proceeding upward therefrom with a regular increase of three-sixteenths of an inch for each of the succeeding indicating-letters of the series of such letters, to wit, "A.," "B.," "C.," "D.," "E.," "F.," "G.," "H.," and "I.," ending with four and twelve-sixteenths inches for the last indicating-letter, "I."

This measurement for the ball of the last for each indicating-letter with all the classifying-letters combined with said indicating-letter is, in fact, the basis or foundation upon which the measurements of the waist and instep of the classifying-letter of each indicating-letter are made up, and each of the several indicating and classifying spaces B for each indicating-letter, as is shown in the drawings, and as is true for all the indicating-letters for all the styles of lasts, whether women's, men's, &c., is headed with a statement showing the relation which the measurement of waist and instep under such indicating-letter and the classifying-letter combined therewith, bears to the measurement of the ball for the indicating and classifying-letter belonging to said indicating and classifying space, and this, particularly shown in the drawings, for the indicating-letter "O.," and the several classifying-letters "K.," "L.," "M.," "N.," "P.," "R.," "S.," "T.," "U.," and "W.," is as follows:

For women's lasts: "O. K.," three-eighths inch between ball and instep, waist one-eighth less than ball; "O. L.," one-half inch between ball and instep, ball and waist the same; "O. M.," one-half inch between ball and instep, one-fourth between ball and waist; "O. N.," five-eighths inch between ball and instep, ball and waist the same; "O. P.," five-eighths inch between ball and instep, one-fourth between ball and waist; "O. R.," three-fourths inch between ball and instep, one-eighth between ball and waist; "O. S.," three-fourths inch between ball and instep, one-fourth between ball and waist; "O. T.," three-fourths inch between ball and instep, three-eighths between ball and waist; "O. U.," seven-eighths inch between ball and instep, three-eighths between ball and waist; "O. W.," one inch between ball and instep, three-eighths between ball and waist.

For men's lasts, (not shown in the drawings:) "O. K.," one-fourth inch between ball and instep, waist one-fourth less than ball; "O. L.," one-fourth inch between ball and instep, ball and waist the same; "O. M.," one-fourth inch between ball and instep, waist one-eighth larger than ball; "O. N.," three-eighths inch between ball and instep, waist one-eighth larger than ball; "O. P.," one-half inch between ball and instep, ball and waist the same; "O. R.," one-half inch between ball and instep, waist two-eighths larger than ball; "O. S.," five-eighths inch between ball and instep, waist two-eighths larger than ball; "O. T.," three-fourths inch between ball and instep, waist one-eighth larger than ball; "O. U.," seven-eighths inch between ball and instep, waist one-half less than instep; "O. W.," one inch between ball and instep, waist three-eighths larger than ball.

For boys' lasts, (not shown in the drawings:) "O. K.," three-eighths inch between ball and instep, ball and waist the same; "O. L.," four-eighths inch between ball and instep, ball and waist the same; "O. M.," one-half inch between ball and instep, waist two-eighths larger than ball; "O. N.," five-eighths inch between ball and instep, waist one-eighth larger than ball; "O. P.," three-fourths inch between ball and instep, waist one-eighth larger than ball; "O. R.," five-eighths inch between ball and instep, waist two-eighths larger than ball; "O. S.," three-fourths inch between ball and instep, waist two-eighths larger than ball; "O. T.," three-fourths inch between ball and instep, waist three-eighths larger than ball; "O. U.," seven-eighths inch between ball and instep, waist three-eighths larger than ball; "O. W.," one inch between ball and instep, waist three-eighths larger than ball.

For youths' lasts, (not shown in the drawings:) "O. K.," one-fourth inch between ball and instep, ball and waist the same; "O. L.," three-eighths inch between ball and instep, ball and waist the same; "O. M.," one-half inch between ball and instep, ball and waist the same; "O. N.," one-half inch between ball and instep, waist four-sixteenths larger than ball; "O. P.," five-eighths inch between ball and instep, waist two-sixteenths larger than ball; "O. R.," five-eighths inch between ball and instep, waist four-sixteenths larger than ball; "O. S.," three-fourths inch between ball and instep, waist two-sixteenths larger than ball; "O. T.," three-fourths inch between ball and instep, waist four-sixteenths larger than ball; "O. U.," three-fourths inch between ball and instep, waist six-sixteenths larger than ball; "O. W.," seven-eighths inch between ball and instep, waist four-sixteenths larger than ball.

For misses' lasts, (not shown in the drawings:) "O. K.," three-eighths inch between ball and instep, ball and waist the same; "O. L.," one-half inch between ball and instep, ball and waist the same; "O. M.," one-half inch between ball and instep, waist four-sixteenths larger than ball; "O. N.," one-half inch between ball and instep, waist two-sixteenths larger than ball; "O. P.," five-eighths inch between ball and instep, waist four-sixteenths larger than ball; "O. R.," five-eighths inch between ball and instep, ball and waist the same; "O. S.," three-fourths inch between ball and instep, waist two-sixteenths larger than ball; "O. T., three-fourths inch between ball and instep, waist four-sixteenths larger than ball; "O. U.," three-fourths inch between ball and instep, waist six-sixteenths larger than ball; "O. W.," seven-eighths inch between ball and instep, waist four-sixteenths larger than ball.

For children's lasts, (not shown in the drawings:) "O. R.," one-fourth inch between ball and instep, waist two-sixteenths larger than ball; "O. L.," three-eighths inch between ball and instep, waist two-sixteenths larger than ball; "O. M.," one-half inch between ball and instep, waist four-sixteenths larger than ball; "O. N.," five-eighths inch between ball and instep, waist four-sixteenths larger than ball; "O. P.," three-fourths inch between ball and instep, waist six-sixteenths larger than ball.

A measurement-indicator for boot and shoe lasts, substantially as above described, for the most convenient use, should have its several sheets arranged in regular order for the different styles of lasts, beginning with the indicating-letter "O.," and proceeding therefrom in the regular order of the alphabet from "A." to "W.," using only the letters before recited, and so arranged they are preferably bound into a book form, beginning with the women's and ending with the children's, in the order before given, and as so bound when the book is opened at any part thereof covered by them for examination, the several indicating and classifying spaces B belonging to any one indicating-letter—such as "O.," or "A.," &c.—will be all displayed on the then opposite pages of the book.

The ordering of boots and shoes by dealers, users, manufacturers, and others with the use of the measurement-indicator of this' invention requires simply the indicating and classifying letters and the size of the last to be mentioned—as, for instance, suppose a pair of women's boots to be wanted, No. 4 in size, and of certain measurements as to waist, instep, and ball—such as six and ten-sixteenths inches at the ball, six and eight-sixteenths inches at the waist, and seven inches at the instep—the order would simply be "4, O. K.," 4 to represent the size of last, O the indicating, and K the classifying letters, calling for reference to the aforesaid tables of measurements to the table of women's marked "O. K.," in the column headed with the figure "4," and from which the desired measurements are ascertained.

With a measurement-indicator for boots and shoes of the character herein fully described it is apparent, first, that a uniform standard or system of measurements of lasts, and one which may be made absolutely correct, is presented; second, that the indicator is most convenient and ready for use; third, that manufacturers, dealers, purchasers, and consumers are placed in a relation to each other such as to secure uniformity and regularity in the boots and shoes manufactured and sold; fourth, that orders for boots and shoes can be at any and all times duplicated with certainty and reliability as to their fit and correspondence with the orders or sales previously made, and the orders need only to include the style of boots and shoes, whether women's, men's, &c., and the indicating and classifying letters, coupled or combined with the size of the last from the columns of sizes of such style.

Characters or symbols other than letters may be employed as the indicating and classifying means of this indicator, but letters are practical and efficient, and besides simple and comprehensive.

Having thus described my invention, what I claim, and desire to secure by Letters Patent, is—

A measurement-indicator for boot and shoe lasts, comprising a series of indicating and classifying spaces, "B.," which are divided into a series of cross-columns, "E. G." in combination with indicating and classifying symbols or characters, and ball, waist, and instep measurements, all placed and arranged in the said columns of said indicating and classifying spaces, substantially as described, for the purpose specified.

In testimony whereof I have hereunto set my hand in the presence of two subscribing witnesses.

JOHN KIMBALL.

Witnesses:
ALBERT W. BROWN,
WM. S. BELLOWS.